United States Patent [19]
Dexter

[11] 3,878,023
[45] Apr. 15, 1975

[54] ELECTRICAL BONDING SYSTEM FOR TIRE RECAPPING

[75] Inventor: Warren L. Dexter, Orinda, Calif.

[73] Assignee: Electra-Bond, Inc., Livermore, Calif.

[22] Filed: Apr. 18, 1974

[21] Appl. No.: 462,105

[52] U.S. Cl. .................. 156/394; 23/290; 34/105; 156/96; 156/124; 156/128 R; 264/27; 425/18; 425/28; 425/41; 425/44; 425/174.6; 425/405

[51] Int. Cl. ............................ B29h 5/04; B01j 3/00

[58] Field of Search ............ 156/96, 110, 123, 124, 156/128, 394 R, 394 FM, 272–275; 23/290; 34/104, 105, 106, 108; 425/18, 24, 34 R, 34 A, 34 B, 41, 404, 405, 445, 446, 455, 472, 44, 174, 174.6, DIG. 13; 264/DIG. 46, 25, 27, 277, 315, 326

[56] References Cited
UNITED STATES PATENTS

| | | | |
|---|---|---|---|
| 1,339,736 | 1920 | Burke | 156/275 |
| 1,375,360 | 1921 | Burke | 156/128 R |
| 2,271,855 | 1942 | Cleveland et al. | 34/105 |
| 2,346,973 | 1944 | Kuster et al. | 23/290 |
| 2,774,409 | 1956 | Skidmore | 156/96 |
| 3,769,121 | 1973 | Martin | 156/128 |

FOREIGN PATENTS OR APPLICATIONS 555,689    1943    United Kingdom.................. 156/96

OTHER PUBLICATIONS

Bandag, Incorporated Annual Report, 1970, pages 10–13, Located in 156/394 FM.

*Primary Examiner*—Clifton B. Cosby
*Assistant Examiner*—John E. Kittle
*Attorney, Agent, or Firm*—Richards, Harris & Medlock

[57] ABSTRACT

A pressure chamber is provided with a locking closure and electrically conducting tire support means for mounting tires to be recapped and connectors for the connection of electrical heating wires of the tires to the support members for controlled heating of the tires and application of pressure thereof in the closed chamber.

9 Claims, 5 Drawing Figures

3,878,023

1

ELECTRICAL BONDING SYSTEM FOR TIRE RECAPPING

BACKGROUND OF INVENTION

In the recapping of tires it is necessary to apply heat and pressure to the new rubber of the tread and to the tire carcass. It has been conventional to employ steam heated pressure molds for tire recapping; however, various alternatives thereto have been proposed. For example, the early U.S. Pat. No. 1,216,654 disclosed the use of electrical heating wires for vulcanizing new tread onto a tire casing or carcass. The recapping system of my co-pending U.S. Pat. application, Ser. No. 390,388, discloses and claims a modern and improved process and system for recapping tires by the utilization of electrical heating wires disposed between layers of rubber as an electrical grid or cushion disposed between casing and new tread and with electrically conducting base members on each edge thereof for the recapping of tires.

In order to obviate the necessity of employing tire molds there has been advanced a variety of different methods of applying the pressure required for bonding of the tread to tire casings and one such method is shown in U.S. Pat. No. 3,236,709.

It has long been recognized that it would be advantageous to replace the steam-heated pressure molds commonly employed for tire recapping and a practical method of heating by electrical current, as disclosed in my above-identified patent application, is a major step in this direction. The present invention provides a further advancement in this field wherein a system is provided for supporting tires to be recapped by means providing electrical energization to the heating wires and enclosing the foregoing in a separable pressure chamber wherein suitable bonding pressure for recapping is obtained.

SUMMARY OF INVENTION

The present invention relates to the recapping of tires wherein electrical heating wires are probided for supplying the heat required. The invention includes a separable pressure vessel having electrically conducting tires support means secured to one portion thereof adapted to support a plurality of tires for recapping. Electrical connectors are provided between base strips of the heating wires and the electrically conducting support means for energizing the heating wires and provision is made for closing and locking the pressure chamber and raising the pressure therein to apply bonding pressure to the tires carried by the support means in the chamber. Air pressure in the chamber forces the tread and casing together at desired pressure.

DESCRIPTION OF FIGURES

The present invention is illustrated as to a single preferred embodiment thereof in the accompanying drawings wherein.

2

Figure 1:
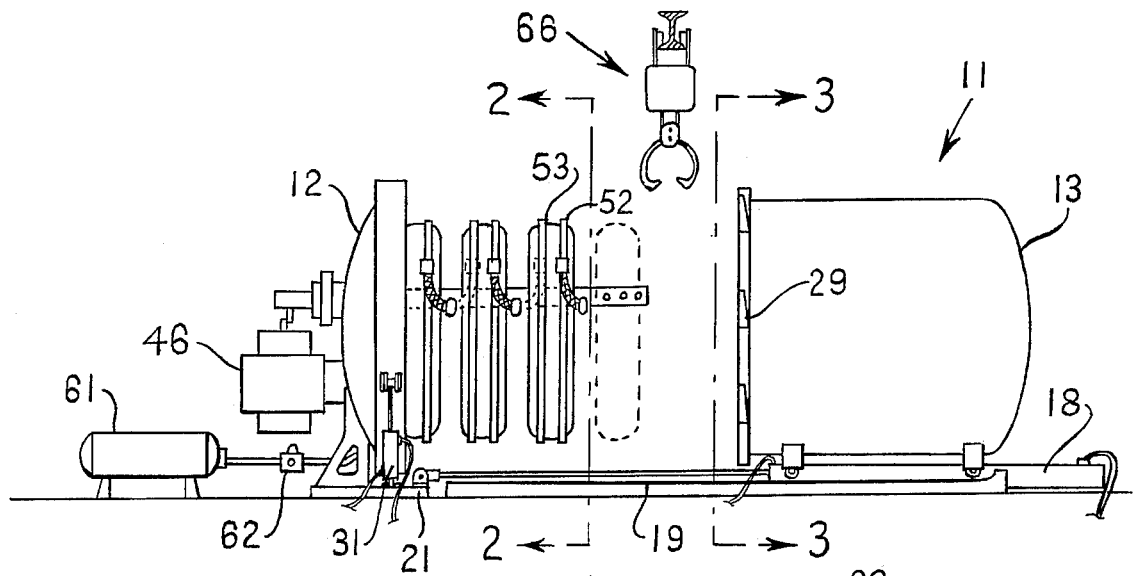
FIG. 1 is a side elevational view of a preferred embodiment of the present invention.
Figure 4:
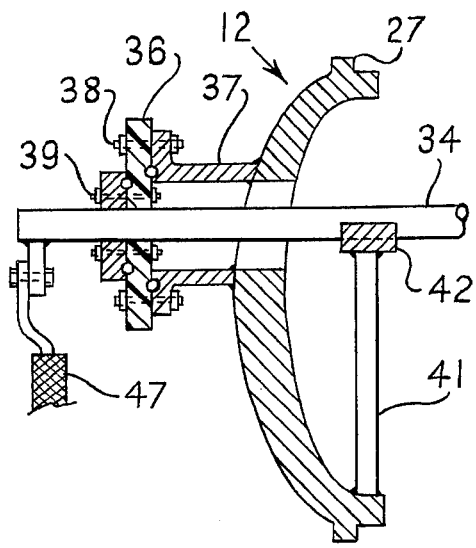
Figure 5:
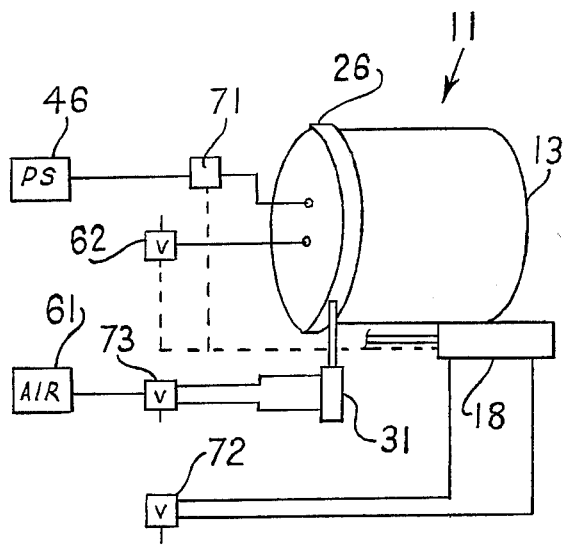

FIG. 4 is a central vertical sectional view taken through the end cap of the pressure chamber of FIG. 1; and FIG. 5 is a schematic illustration of controls for the system of the present invention.

DESCRIPTION OF PREFERRED EMBODIMENT

The present invention provides a system for the application of heat and pressure for recapping tires. The application of new tread to a tire casing or carcass requires the application of heat and pressure and heat is herein applied by the utilization of embedded electric heating wires in a cushion or the like inserted between the tire casing and new tread. Although various different systems of electric heating may be employed, reference is made to my process of U.S. Pat. application Ser. No. 390,388 for a description of a preferred method and apparatus for applying heat in the recapping of tires. No detailed discussion of this electrical heat bonding is herein included; however, it is noted that electrical heating wires extend transversely across the casing beneath the tread with electrically conducting base strips about each side of each tire whereby the application of electrical power between such strips causes current to flow through the heating wires to raise the temperature of the bonding rubber. Electrical connection to the heating wires is only schematically illustrated in the drawings of this application.

Referring now to FIG. 1, there will be seen to be provided a pressure vessel 11 comprising a stationary end cap 12 and a movable cylinder 13 having an open end facing the end cap. The cylinder 13 is preferably mounted upon rails 14 as by means of wheels 16 for movement only in line with the end cap and movement of the cylinder is controlled by a hydraulic or pneumatic cylinder or piston 18 which may have the housing thereof secured to the cylinder and the piston rod 19 thereof extending into engagement with mounting means 21 for the end cap 12.

Figure 2:
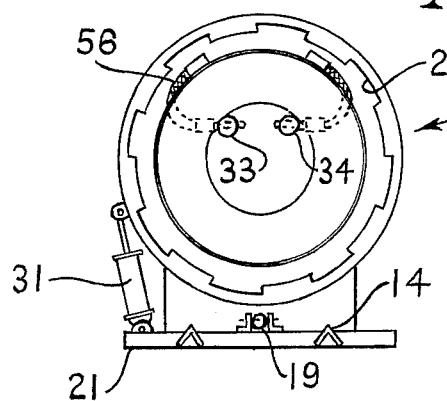
FIG. 2 is a transverse sectional view taken in the plane 2—2 of FIG. 1.
Figure 3:
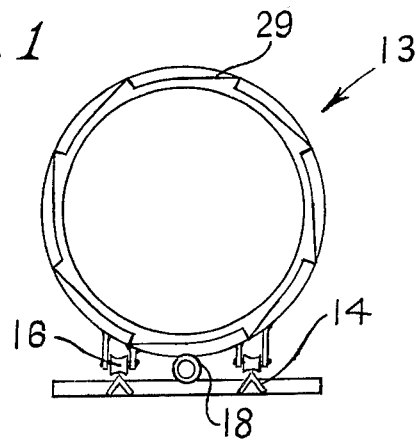
FIG. 3 is a transverse sectional view taken in the plane 3—3 of FIG. 1.

The separate portions of the pressure chamber 11 are adapted to be secured together during tire processing and to this end there is provided a locking ring 26 about the end cap and rotatable upon a peripheral flange 27 thereabout. The locking ring 26 is provided with radially extending indentations about the inner circumference of an inwardly extending flange thereof, as illustrated in FIG. 2, and these are adapted to mate with lugs 29 about the open end of the cylinder 13. These lugs 29 have inclined rear surfaces, as illustrated in FIG. 1, so that insertion of the lugs in the indentations of the ring 26 and subsequent rotation of the ring will lock together the two portions of the pressure chamber and seal the chamber. In order to rotate the locking ring 26 there is preferably provided a pneumatic or hydraulic cylinder 31 secured to the mounting means 21 and having a piston rod thereof extending into pivotal engagement with the ring 26. Actuation of the cylinder 31 will thus be seen to rotate the ring and with the cylinder and end plate in contact this will then lock these two elements together to form a sealed pressure chamber.

Provision is made in accordance with the present invention for mounting tires upon the end cap 12 and to this end there is provided a pair of support members 33 and 34, preferably formed as heavy metal rods extending in parallel spaced relation in a horizontal direction from the end plate 12. These rods are mounted on the end plate in insulated relationship thereto, as illustrated, for example, in FIG. 4. Considering the rod 34, same will be seen to be mounted on insulating plate 36 secured across the end of a box extension 37 of the end plate as by bolts 38. A mounting plate 39 is bolted to this insulating plate 36 with the rod 34 extending through both insulating plate and mounting plate. Appropriate sealing means may be provided to ensure a pressure seal at the mounting of the support means 33 and 34. Inasmuch as these support means are adapted to carry a substantial weight of tires, there is preferably provided one or more insulating braces 41 extending upwardly from the lower interior of the end plate 12 and carrying a bracket 42 for bracing the support members.

The support members 33 and 34 are adapted to carry electrical current for energizing heating wires in recapping of tires and to this end a power supply 46 is connected as by means of conductors 47 across the support means 33 and 34.

The support means extend from the inner face of the end plate 12 a distance somewhat less than the length of the cylinder 13 and are adapted to carry tires 51 for recapping. These tires are previously prepared as, for example, in accordance with the teachings of my above-identified patent application, to provide a pair of circumferential contacts 52 and 53 thereabout. The two bars 33 and 34 of the support means are spaced apart, either by air or insulation, an appropriate distance so as to readily accommodate the placement of tires thereover as illustrated, for example, in FIG. 2. The tires rest upon these support means and there are provided connectors 56 preferably attached to the circumferential conductors 52 and 53 of each tire and adapted for connection to opposite conductors 33 and 34 of the support means.

With the tires 51 mounted upon the support means 33 and 34 the connectors 56 of each tire are connected one to each of the electrical conductors 33 and 34 of the support means. Such connection may be a simple one prong connection into appropriately formed receptacles in the support means ensuring goood electrical connection from one support means or bar 33 through the electrical heating wires of the tire back to the other support means or conductor 34. With each of the tires so connected, the pressure vessel 11 is then closed by moving the cylinder 13 into engagement with the end plate 12. The locking ring 26 is then rotated as by cylinder 31 to seal the pressure chamber. In this condition the system of the present invention is in condition for retreading or recapping of tires. There is provided a source of air pressure illustrated in FIG. 1 by the tank 61 but which may, of course, incorporate an air compressor or the like, connected through a control valve 62 to the interior of the pressure vessel. With the vessel sealed, the interior pressure thereof is raised to exert the desired pressure between new tread and tire casing of the tires to be retreaded in the vessel. Heat is applied by operating the power supply 46 so that electric current flows through the heating wires of the tires and bonds or vulcanizes together the tire casing and new tread. The actual process of tire recapping is controlled by time and temperature. It is possible to monitor the temperature of the cushion as a measure of bonding or alternatively the current flow may be calibrated so that a particular current is applied for a predetermined period of time to accomplish bonding or vulcanizing of tread to tire.

The present invention is applicable to tires of all sizes. Particularly with regard to tires of large size, it is advantageous to provide means for moving the tires into and out of the pressure wheel. In FIG. 1 there is illustrated an overhead crane 66 adapted for lowering into position for swinging tires onto and off of the support means of the present invention. With the crane disposed immediately outward of the ends of the support means, as shown, it is possible to engage the crane with an outermost tire and then, merely by raising the crane hook, to lift the tire from the support means and swing it upwardly so that the tire may be removed by moving the crane along a track transverse of the apparatus of the present invention. Similarly, tires may be mounted by merely lifting a tire with the crane and moving it into alignment with the support means and then swinging the tire over the support means as the crane hook is lowered.

It will be appreciated that the present invention is operated in a particular sequence of operations and there are provided control means and suitable interlocks for such operation. In this respect reference is made to FIG. 5 schematically illustrating the control means in connection with the pressure vessel 11. The power supply 46 is schematically illustrated to be connected through control means 71 to the two conductors of the support means 33–34 within the pressure vessel. The source of high pressure air 61 is shown to be connected through a valve 72 to the pneumatic cylinder 18 for moving the cylinder 13 of the vessel backwards and forwards. A control valve 73 connects the air supply 61 to the ring cylinder 31 for locking and unlocking the two portions of the vacuum vessel together. The control valve 62 connects the air supply 61 in the interior of the vessel 11 and preferably there are provided interlocks, as indicated with the dashed lines in FIG. 5, such that neither electrical energization nor air pressure may be applied internally of the vessel unless same is sealed. Of course, it will be appreciated that provision is made for exhausting the vessel as well as exhausting appropriate ends of the control cylinders 18 and 31, as indicated by the short lines extending from the control valves 61, 72 and 73.

Again, it is noted that the actual retreading operation by electrical heating is not described in detail herein, for it will be apparent that it is possible to electrically energize heating wires embedded in rubber to raise the temperature of the rubber. By the application of heat and pressure to such rubber, it is then possible to bond or vulcanize the rubber and reference is again made to my above-noted co-pending patent application for a description of a preferred process and structure for recapping tires by electrical heating. The present invention provides an improved manner of applying pressure during tire recapping without the necessity of employing pressure molds. In particular, the present invention is adapted to electrically heating tires for recapping wherein the support means of the present invention carry the tires to be recapped and at the same time provide the conduits for energization of electrical heating wires. It is also to be appreciated that certain of the operations with the system of the present invention may be automated; however, no attempt is made herein to describe details thereof.

Although the present invention has been described with respect to a single preferred embodiment thereof, it is not intended to limit the invention to the details of illustration nor precise terms of description, for it will be apparent to those skilled in the art that various modifications may be made within the scope of the invention.

What is claimed is:

1. A system for applying heat and pressure to recap tires wherein a tire carcass has layered rubber and heating wires disposed thereabout with new tire tread thereover and gripped thereon by circumferential conducting hoops electrically connected to said heating wires comprising
    a shell having first and second separable portions and means for locking said portions together in pressure sealing relation,
    a pair of electrically conducting support members mounted in a first shell portion in insulated relation thereto for mounting tires to be recapped,
    said support members having connecting means for engagement with electrical connections from tires mounted on said members,
    controllable power supply means connected to said support members for energizing the heating wires of tires mounted on said members, and
    pressurizing means connected to said shell for pressurizing the interior thereof when said shell portions are connected together to apply a pressure to tires on said support members for vulcanizing new tread to the tires.

2. The system of claim 1 further defined by said support members comprising horizontally extending, parallel, spaced-apart metal rods mounted in insulated relation to the interior of said first shell portion.

3. The system of claim 2 further defined by an upright structural insulator engaging said first shell portion and said support members in spaced relation to the engagement of support members and shell portion for bracing the support members.

4. The system of claim 1 further defined by said shell portions having open ends facing each other, said first shell portion being mounted in fixed position,
    means mounting said second shell portion for translation thereof toward and away from said first shell portion, and
    a locking ring disposed about the open end of said first shell portion in rotatable relation thereto for engagement with said second shell portion about the open end thereof for sealing said shell portions together.

5. The system of claim 4 further defined by
    said second shell portion being mounted upon a track for movement in line with said first shell portion,
    piston drive means connected to said second shell portion for movement of said second shell portion along said track into and out of engagement with said first shell portion, and
    piston means engaging said locking ring for rotating said ring to seal and unseal said shell portions.

6. A system for pressurizing tires during heating of tires for recapping wherein the tires include cushions having embedded heating wires with base strips connected thereto about opposite tire sides comprising
    means defining a pressure chamber including a hollow cylinder with an open end and a relatively movable end plate adapted to close said open end,
    tire support means mounted on said end plate in extension toward said cylinder and including a pair of electrical conductors adapted for connection across power supply means,
    electrical connectors for connecting base strips on opposite sides of said tires to separate conductors for passing current through the heating wires to heat the tires,
    locking means adapted to engage said cylinder and end plate for sealing same together, and
    pressurizing means extending into said chamber for pressurizing the interior thereof to apply bonding pressure to tires mounted on said support means within said chamber.

7. The system of claim 6 further defined by
    said cylinder and end plate having a track therebetween for carrying one portion of said chamber defining means toward and away from the other,
    drive means for moving said one portion of said chamber defining means into and out of engagement with the other along said track,
    means actuating said locking means to move same between lock and unlock position, and
    interlock means controlled by the means actuating said locking means to enable electrical connection of power supply means across said electrical conductors and pressurization of said chamber only in the lock position of said locking means.

8. The system of claim 6 further defined by said tire support means comprising a pair of rigid parallel electrically conducting bars extending from said end plate a distance slightly less than the depth of said hollow cylinder, said bars extending through said end plate in insulated relation to each other and to said end plate for connection across a power supply exteriorly of said pressure chamber and said bars being braced on the inner side of said end plate to support tires through which the bars are adapted to extend.

9. The system of claim 6 further defined by a crane mounted for movement laterally of said pressure chamber across the ends of said tire support means with hook means adapted to be flexibly raised and lowered whereby tires may be swung onto and off of said support means.

* * * * *